United States Patent [19]

Thompson et al.

[11] Patent Number: 5,215,246
[45] Date of Patent: Jun. 1, 1993

[54] METHOD AND APPARATUS FOR BRAZING

[75] Inventors: R. G. Thompson, Jefferson County, Ala.; Mark D. Dixon, Carroll County, Ga.; B. Radhakrishnan, Jefferson County, Ala.; William M. Berry, III, Coweta County; Darnell Smith, Carroll County, both of Ga.; John Cassimus, Birmingham, Ala.

[73] Assignee: Southwire Company, Carrollton, Ga.

[21] Appl. No.: 815,665

[22] Filed: Dec. 31, 1991

[51] Int. Cl.⁵ ............................................. B23K 31/02
[52] U.S. Cl. .................................... 228/171; 228/4.1; 228/13; 228/44.7; 228/258; 29/869; 269/43
[58] Field of Search ............... 228/171, 212, 4.1, 13, 228/5.7, 44.7, 258; 269/43; 29/868, 869, 872, 873; 191/44.1, 33 PM

[56] References Cited

U.S. PATENT DOCUMENTS

| | | | |
|---|---|---|---|
| 1,146,612 | 7/1915 | Carter | 228/171 |
| 2,774,262 | 12/1956 | Sowter | 228/13 |
| 3,336,657 | 8/1967 | Flaming | 228/171 |
| 3,912,151 | 10/1975 | Martin et al. | 228/171 |
| 4,473,942 | 10/1984 | Ridgway | 29/869 |
| 4,811,936 | 3/1989 | Laymaster | 269/43 |

FOREIGN PATENT DOCUMENTS

| | | | |
|---|---|---|---|
| 521105 | 7/1953 | Belgium | 29/869 |
| 31004 | 9/1971 | Japan | 228/171 |
| 83388 | 3/1989 | Japan | 228/171 |
| 1222471 | 4/1986 | U.S.S.R. | 228/171 |
| 376757 | 7/1932 | United Kingdom | 269/43 |

*Primary Examiner*—Samuel M. Heinrich
*Attorney, Agent, or Firm*—James W. Wallis, Jr.; Stanley L. Tate; George C. Myers, Jr.

[57] ABSTRACT

Method and apparatus for holding the ends of two metal rods which are to be joined, cutting a face on each of the two metal rods, maintaining alignment of the two cut faces, and providing proper compressive force on the two rods while they are joined by a brazing operation.

8 Claims, 2 Drawing Sheets

METHOD AND APPARATUS FOR BRAZING

TECHNICAL FIELD

This invention relates to a method and apparatus for positioning two metal rods while joining their ends together. More particularly, this invention is directed to a method and apparatus for preparing and positioning the ends of two metal rods which are to be joined together by a brazing operation, such that they, the ends of the two metal rods, will be held in proper index for cutting and in proper position for joining by brazing.

BACKGROUND ART

In the art of joining metals, brazing and welding are certainly common and well known methods. Brazing differs from welding in that brazing does not involve melting the metals being joined and welding does. The metal elements being joined are known as the base metal. When rods are joined end to end, the joint between them is known as a butt joint. Typically, when rods are joined end to end, they are either welded or they are brazed. Welding metal rods together involves melting and re-solidifying the rod base metal itself; some metal of each of the rods is melted and solidified such that a new solid joint is formed between the two rods when the molten metal solidifies. The weld which produces such an end to end joint is know as a butt weld.

There are times, however, when welding is not the most desirable method for forming the joint so described. Melting the parent metal can produce undesirable characteristics in the joint so formed. In such cases, the alternative to welding is brazing.

Brazing is a process which joins two metals together by creating a metallurgical bond between an intermediate filler material and the two metals being joined. In brazing, the parent metal is not melted. Since the parent metal of the material being joined is not melted, the joining process takes place at lower temperatures than in the case of welding the exact same material. In a simple form, the mechanism of forming a butt joint by brazing comprises two masses of metal, separated by a narrow, but defined, substantially uniform gap. The two masses are heated to a temperature high enough to melt a brazing filler material. When the masses are sufficiently hot, the filler material is brought into contact with the hot masses whereon the filler material is melted. The spacing between the two masses is configured such that when the brazing filler material melts, it (the filler material) is drawn into the gap between the two masses by capillary action. Upon solidification of the brazing filler, a metallurgical bond is established between the filler material and each metal mass. Since each metal mass bonds to the filler material, and the filler material is positioned between the two masses, it follows that the bond which is created between each mass and the filler results in each mass being bonded, by way of the filler, to each other.

The quality of the brazed joint depends upon many factors. Some factors are: the uniformity of the two faces being joined; the alignment of the faces being joined; the spacing of the two faces being joined; and the propensity of the metal being joined to form a metallurgical bond with the brazing filler material being used.

The propensity of the metal being joined to form a metallurgical bond with the brazing filler material being used, as well as the heating techniques, will be a function of selecting the proper filler for the application at hand and using the proper heating techniques. It will be presumed that the filler and its propensity to bond with the parent metal will be suitable, as will the suitability of the heat and temperature of the process.

The quality of the resulting joint is thereafter dependent upon the preparation and execution of proper techniques in preparing the base metal for the brazing process. The uniformity of the bonding faces of the metal being joined and their position during the brazing operation cannot be overemphasized. In joining solid rods, the ends being joined must be prepared and cut such that there are no rounded corners. The cut face should have neither high spots nor low spots which would result in a significant variation of the distance from one face being joined to the other. Given a constant and acceptable chemistry of the metals involved in forming the joint, the degree of the metallurgical bond is ultimately dependant upon the flatness of the surface of the face of the rods being joined and how well they are positioned during the brazing process. If the two faces being joined are not sufficiently flat, there will be thick and thin areas of the brazing filler material as well as the possibility of areas having no filler at all. If the two faces are not sufficiently equidistantly positioned, there will be variation in the thickness of the gap therebetween and drawing the filler into the gap by capillary action may be compromised. With uneven faces, the bond obtained may also be compromised.

It should also be obvious that alignment of the faces is another critical element of the joint. If the faces are aligned such that the spacing on one side of the joint is too wide, there may be no uniform capillary action to draw the filler into the entirety of the joint. No filler in parts of the joint means no metallurgical bond at those parts. No bond in part of the joint necessarily produces a weaker joint than one wherein the entirety of the faces are bonded. If the alignment is such that no capillary action results when the molten filler is exposed thereto, the result would again be no filler at all drawn into the joint. Again, no filler means no bond and no joint.

The gap spacing between the faces is another factor affecting the quality of the joint. Even with proper facial and axial alignment of rods and rod faces being joined, lack of control of the dimensions or uniformity of the gap between the two faces will certainly adversely affect the formation of consistent, high quality joints.

Manufacturing requirements dictate that production processes be simple and free of as many opportunities to introduce errors as possible. In joining solid rods end to end, the cut faces of the rods can be virtually any angle as measured from the centerline of the rod itself. The only real restriction is that both rods must be cut at substantially the same angle if the resulting length of rod is to be substantially straight. Any angle chosen will be a compromise of a plurality of considerations. If the chosen angle is 90 degrees, that is to say that each section of the rod is cut substantially square to its longitudinal axis, then the alignment of the two masses that are to be joined is probably the most straightforward. This is true because either rod could be rotated about its longitudinal axis and its cut face would still be properly aligned with that of the other rod. In such a joint, the rod is cut square to its length, the sections are held one against the other in some type of guide, and they are then heated and brazed. The disadvantage of this method is that the square cut results in a minimum area of rod face that is exposed to the brazing material for bonding. All other factors being equal, the joint so obtained is the weakest butt joint that is possible. Stronger joints are created when the surface area being bonded is increased. The maximum area would be exposed as the angle of the cut approaches 180 degrees. This 180 degree cut is a longitudinal splitting of the rod and can be quickly seen as impractical and worthy of no consideration. A compromise between the two extremes is the proper choice. An angle of 135 degrees, or 45 degree if the internal angle is measured, is an angle that provides an acceptable compromise of increased bonding area for a given diameter rod, while at the same time is an angle that can be reasonably worked with to produce proper gap spacing and uniform facial alignment.

Another consideration in forming a joint by brazing is the effect of thermal expansion of the parent metal as the joint is heated and the thermal contraction of the parent metal as the joint is cooled. If the two rods are each held in a fixed device to keep them aligned, the joint will be placed in compression as the parent metal expands upon being heated. Likewise, the joint will be placed in tension as the parent metal contracts upon cooling. This compression and tension can adversely affect the joint formed by brazing. Expansion of the parent metal can result in a compression that will force the gap together and expel too much filler material. Upon cooling and contracting, tension can actually tear the parent metal from the filler and weaken the metallurgical bonds in the joint being formed.

DISCLOSURE OF THE INVENTION

It is therefore a primary object of the present invention to provide a method and apparatus for positioning metal rods and cutting metal rods such that their cut faces may be aligned and held in a preselected position while the joint is formed by brazing.

It is a further object of the present invention to provide a method and apparatus for holding two metal rods being joined by brazing such that as the metal of the rods being joined expands and contracts, there is a compensation for the expansion and contraction which provides constant compression of the joint being formed.

It is a further object of the present invention to provide a method and apparatus for holding metal rods and cutting the ends of metal rods for joining by brazing such that they may be properly positioned for joining without the necessity of additional means for aligning.

It is still a further object of the present invention to provide a method and apparatus for compensating for thermal expansion and contraction as the joint is formed by brazing.

The principal feature of the present invention is an apparatus that holds two rods such that their ends may be cut and the resulting cuts are then properly aligned, one with the other, such that a high quality brazed joint can be produced.

Still an other feature of the present invention is an apparatus that will properly position the cut faces of solid metal rods while the rods are secured in position to be brazed.

Even another feature of the present invention is an apparatus that will compensate for thermal expansion and contraction of solid metal rods when they are joined by brazing.

Another feature of the present invention is a combination of means for holding rod ends, for providing consistent angles of the cuts made thereon, and for eliminating the effects of compression and tension due to normal thermal changes occurring when the brazed joint is made.

The principal advantage of the present invention is the ability to consistently make brazed joints which have physical characteristics which meet or exceed those of joints produced using current technology.

Another advantage of the present invention is that it can be successfully implemented by brazing technicians after only very elementary training.

Another advantage of the present invention is the simplicity of its implementation.

Another advantage of the present invention is the uniformity of joints made from operator to operator.

Another advantage of the present invention is the uniformity of the joints from joint to joint.

Another advantage of the present invention is the relatively small expense involved in its implementation.

In accordance with these and other objects, features, and advantages, there is provided a method and apparatus which will contribute to the joining of two metal rods, by brazing, such that the error associated with alignment, surface preparation, and interface gap control is substantially eliminated.

BEST MODE OF CARRYING OUT THE INVENTION

Figure 1:
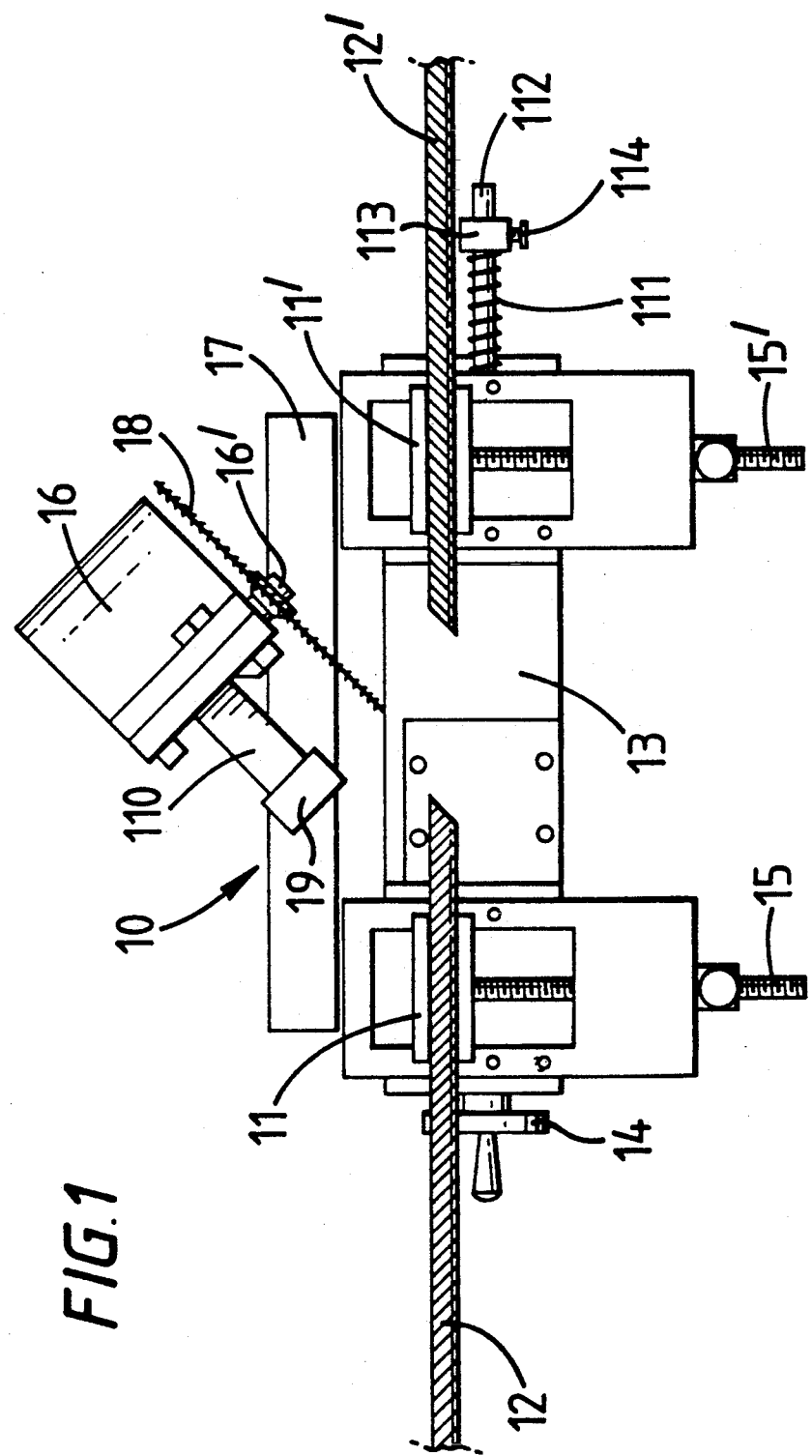
FIG. 1 is a plan view of the apparatus of the present invention showing the relationships of its major components.

Refer now to FIG. 1, which is a plan view of the apparatus of the present invention showing the relationships of its major components.

Apparatus 10 comprises a pair of substantially identical rod vices 11 and 11' for holding lengths of rod 12 and 12'. Vice 11 is attached to apparatus frame 13 such that it is positionable along the longitudinal axis of rod 12 by means of hand crank 14 operating on longitudinal screw (not shown) within said frame 13. Rod vices 11 and 11' engage rod sections 12 and 12, respectively by means of jaw screws 15 and 15'. Rod 12 is secured in jaw 11 such that it passes through jaw 11 and into the space between jaw 11 and 11'. Motor 16 is activated whereon blade 18 is attached. As motor 16 is activated and begins to turn shaft 16', blade 18, attached to shaft 16', begins to turn. Blade 18 is brought into contact with rod 12 as motor 16 is pivoted about pivot 19 attached to motor support 110. As blade 18 contacts rod 12, it cuts rod 12 at a preset angle. Pivot 19 is attached to frame 13 such that the angle of the cut made when blade 18 contacts rod 12 is definable. That is to say, the angle at which blade 18 cuts rod 12 can be predetermined by actions of an operator. After rod 12 is cut, rod 12' is secured in jaw 11' with rod 12' passing through jaw 11'. Pivot 19 is moved along a track 17, whereon it is attached, until blade 18 can be brought into contact with rod 12'. Motor 16 is activated and the same process set out above for cutting rod 12 is repeated on rod 12'. After both rods 12 and 12, are cut, blade 18 is withdrawn and crank 14 is rotated to bring vice 11 into close proximity to vice 11'. After vice 11 is brought into close proximity to vice 11', a small mass of brazing filler (not shown) is placed between the cut face on rod 12 and the cut face on rod 12'. While holding filler (not shown) between the cut face on rod 12 and the cut face on rod 12', rod 12' is brought into light compression against rod 12 by engaging biasing spring 111. Spring 111 is positioned about shaft 112 and acts against vice 11' and spring stop 113. When spring stop 113 is brought closer to vice 11' along shaft 112, spring 111 exerts pressure on vice 11' which is slideably attached to frame 13. As pressure is exerted on vice 11' by spring 111, vice 11' is forced toward vice 11. Vices 11 and 11' are positioned such that rods 12 and 12' are axially aligned when secured in vices 11 and 11' respectively. With rods 12 and 12' being cut while fixed in vices 11 and 11' by blade 18 which is angularly fixed and only moved along the axis of the rods 12 and 12' on track 17, the angles of the faces cut on rods 12 and 12' by blade 18 are substantially identical. By moving vices 11 and 11' axially along the axis of rods 12 and 12', alignment of the cut faces is maintained. After the cut faces of rod 12 and 12' are brought sufficiently close to each other that they contact brazing filler (not shown), additional compression is applied by spring 111 acting about shaft 112 and secured by stop 113. The degree of compression is determined by the position of stop 113 along shaft 112. Vice 11' is forced into compression by spring 111 forcing vice 11' along frame 13 whereon it is slideably attached. Being slideably attached, vice 11' is movable along frame 13 if forces acting on it are greater than the forces exerted by the compression supplied by spring 111 acting thereon. As rods 12 and 12' are heated in order to melt brazing filler (not shown) and expand, vice 11' will "give" and the compression on the joint being formed when filler (not shown) will remain constant. After filler (not shown) is melted by heat applied to rods 12 and 12', vice 11' will again slide along frame 13 so as to provide constant compression on filler by rods 12 and 12'. After filler melts and heat is removed, rods 12 and 12' will cool and contract. Slideably mounted vice 11' will follow this contraction and will prevent the joint from experiencing tension which could pull the joint apart.

The joint is accomplished in its entirety by a constant predetermined compression applied thereon during its formation. Neither excessive compression nor tension is present in the joint's formation. The uniform compression assures consistent joints.

Figure 2:
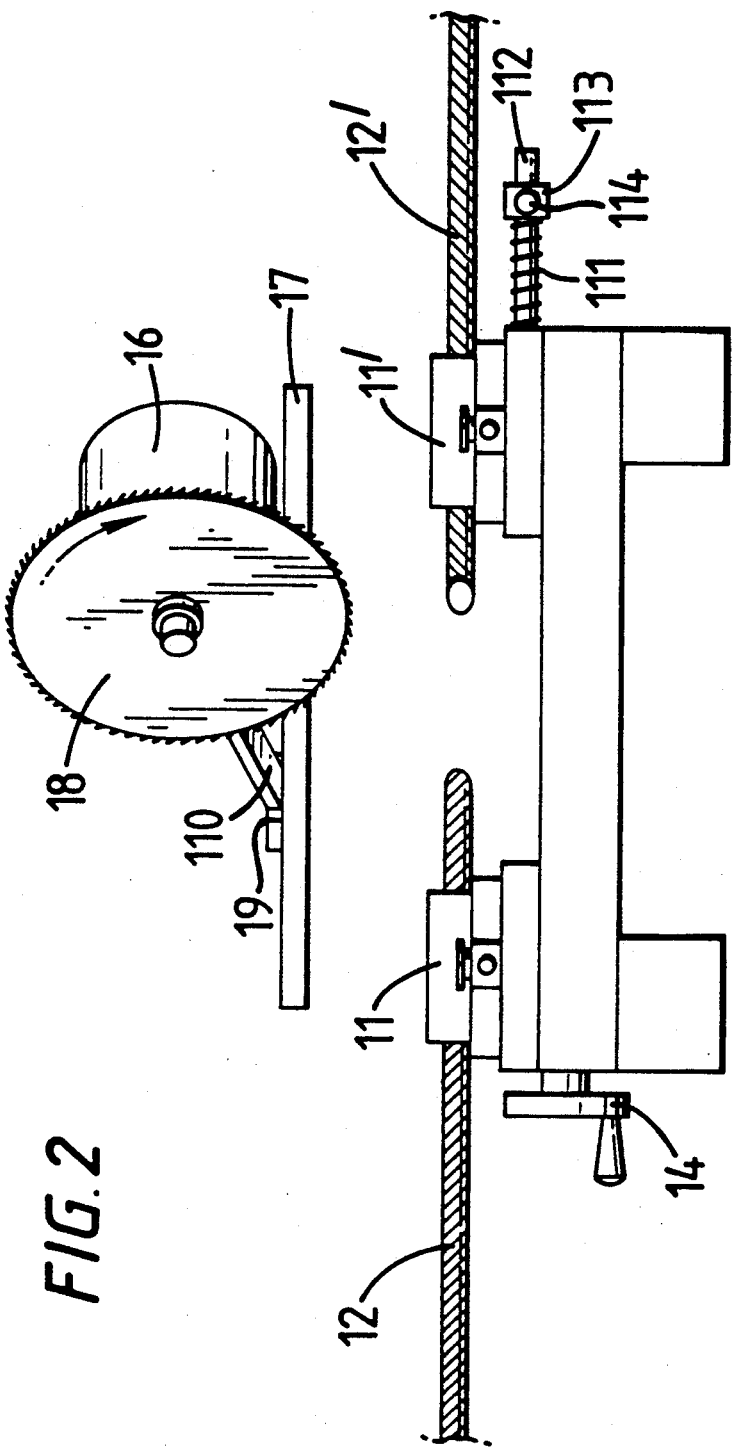
FIG. 2 is a elevation view of the apparatus of the present invention showing the relationships of its major components.

Refer now to FIG. 2, which is an elevation view of the apparatus of present invention showing the relationships of its major components. The discussion of elements of like number in FIG. 1 are also applicable to FIG. 2, and are incorporated herein by reference in their entirety just as if hereinagain set out. Blade 18 is shown mounted on the opposite end of motor 16 and is also shown cutting from the opposite direction. This is to illustrate that the position of blade 18 on motor 16 as well as a right or left hand cutting of the angle on rods 12 and 12' is equally workable. The invention does not deal with which direction the cut is made, only that the cuts on rods 12 and 12' are uniform and consistent for each cut.

Although the invention has been discussed and described with primary emphasis on one embodiment, it should be obvious that adaptations and modifications can be made for other systems without departing from the spirit and scope of the invention.

What is claimed is:

1. An method for preparing sections of metal rods for joining by brazing comprising:
   providing at least two metal rods to be joined;
   cutting the ends of each said rods to be joined thereby producing a cut face;
   positioning said cut ends one adjacent to the other;
   providing a heat source for heating said rods;
   heating said rod sections;
   contacting said rod sections with a brazing alloy filler; and
   allowing said brazing filler to melt on said heated rod.

2. The method according to claim 1, wherein each said rod end is cut and including the step of cutting each said rod end at substantially the same angle.

3. The method according to claim 2, including the additional step of cutting said ends of each said rod at an angle of between thirty degrees and sixty degrees.

4. The method according to claim 3, including the additional step of cutting said ends of each said rod at an angle of between forty degrees and fifty degrees.

5. The method according to claim 3, including the additional step of cutting said ends of each said rod at an angle of forty five degrees.

6. The method according to claim 1, wherein each said cut end of each said rod are positioned one adjacent to the other and including the additional step of positioning each said cut face parallel to the other said cut face and being separated by a defined space.

7. The method according to claim 6, including the additional step of allowing said filler to flow into said defined space between said cut faces on said rods.

8. The method according to claim 7, including the additional step of heating said filler material and said rods after said filler has solidified after it has flowed into said space between said cut faces on said rods.

* * * * *